Patented Sept. 19, 1944

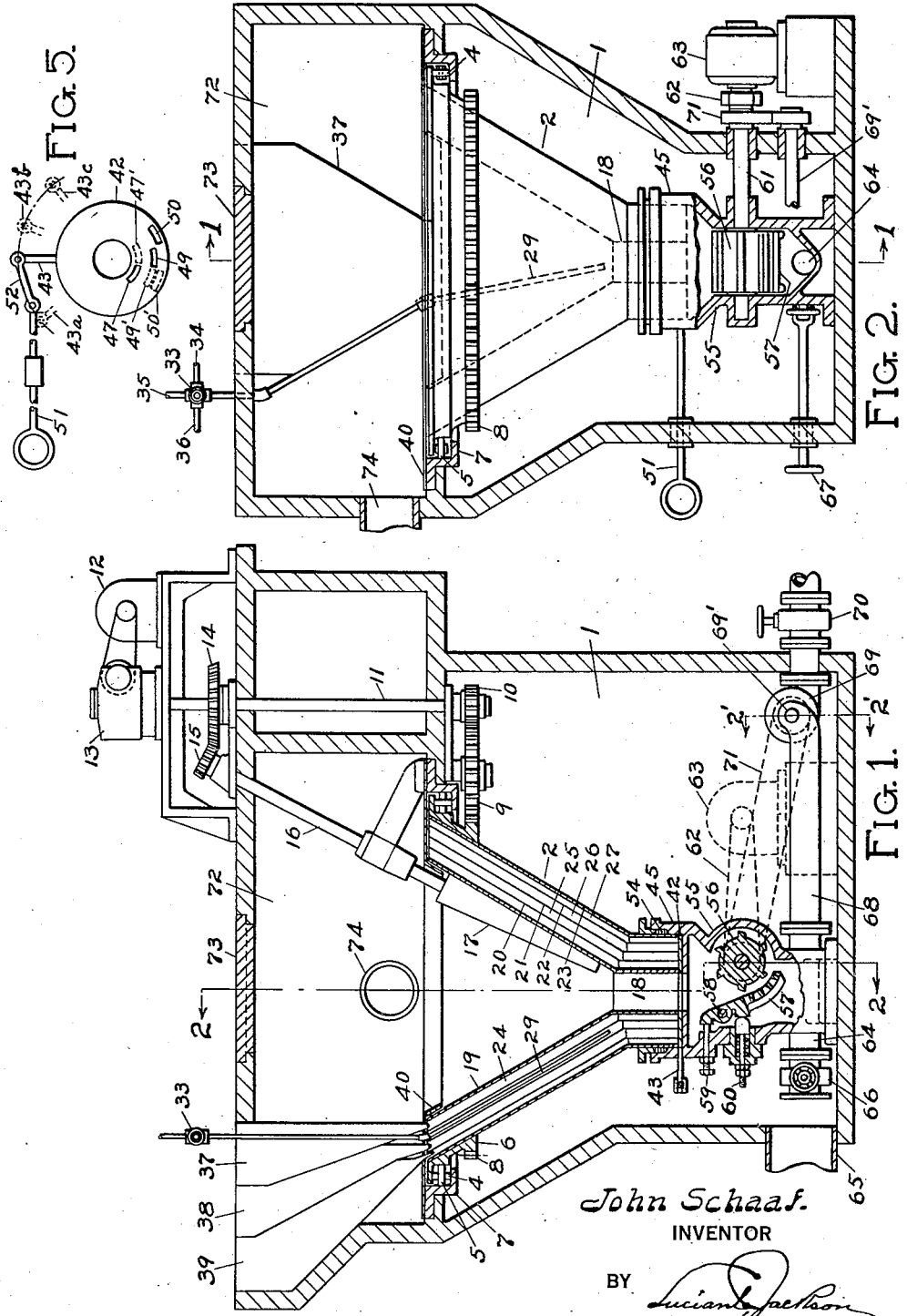

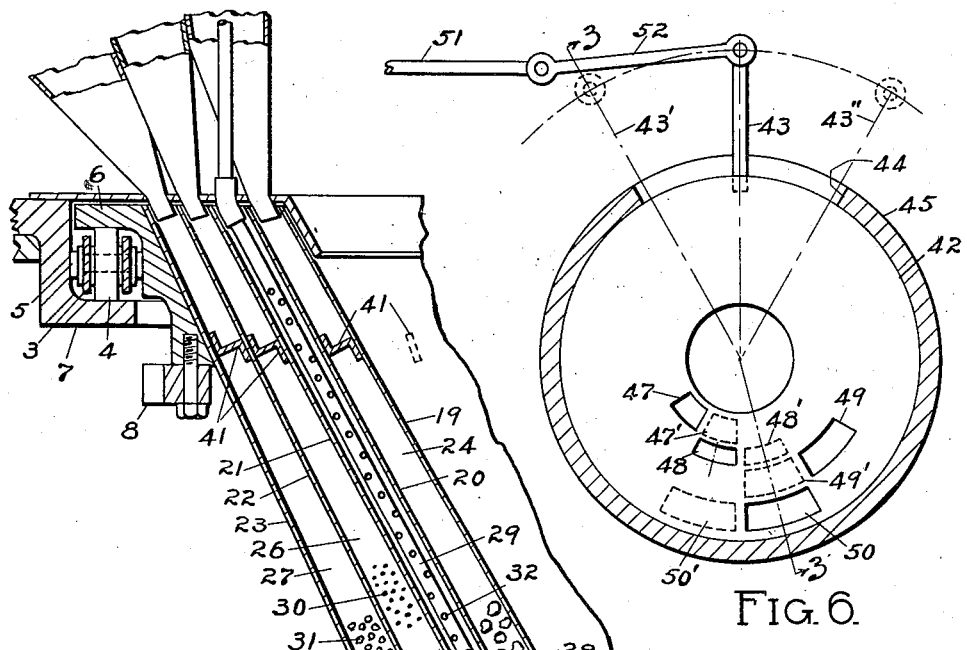
FIG. 6.
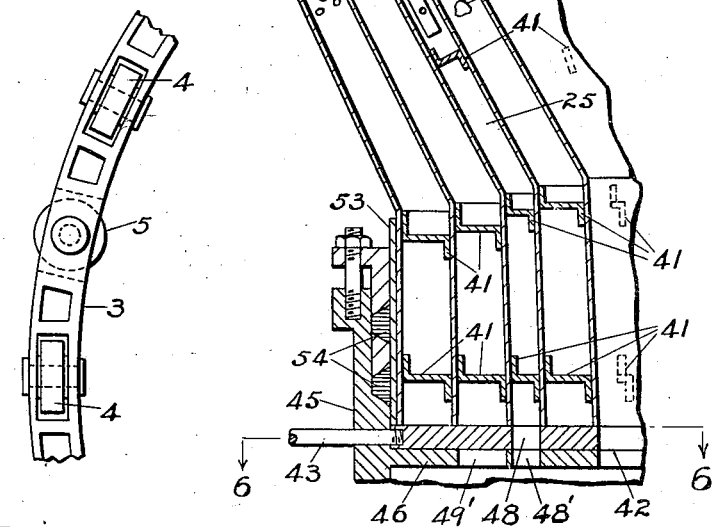
FIG. 4.
FIG. 3.
John Schaaf
INVENTOR

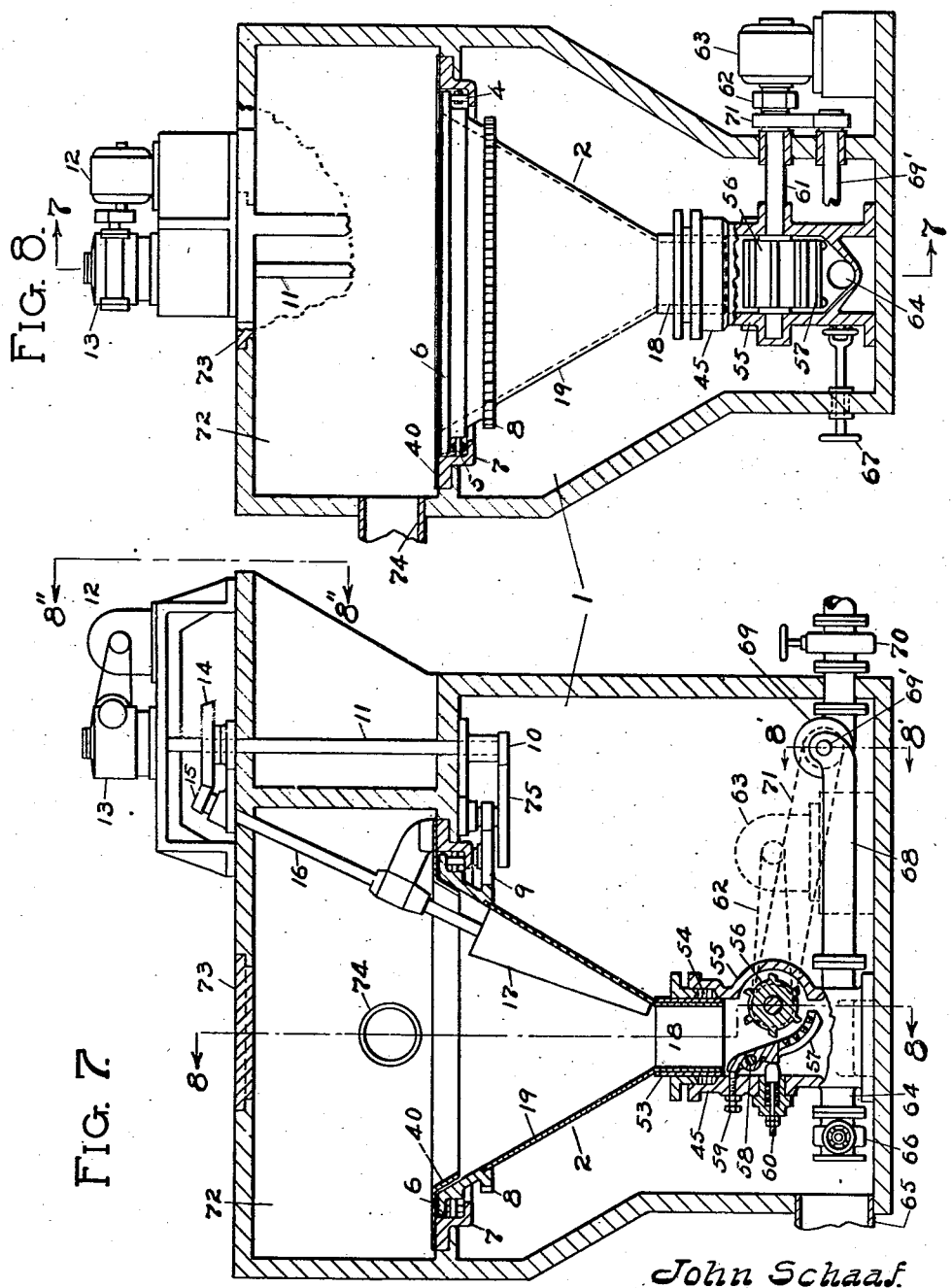

2,358,736

UNITED STATES PATENT OFFICE 2,358,736

MEANS FOR CLARIFYING LIQUIDS

John Schaaf, Buffalo, N. Y.

Application February 11, 1941, Serial No. 378,402

15 Claims. (Cl. 210—2)

My invention relates to a method and means for clarifying liquids and more particularly to purifying sewage by collecting and comminuting the foreign matter in a shredder through which one part of said sewage passes and chemically treating and aerating the balance of the sewage which is filtered to remove the sewage solids.

One object of my invention is to provide a method and means to collect and dispose of the foreign material floating in a liquid to be clarified.

Another object is to provide a method and means to filter and clarify the portion of a sewage stream which passes through a screen and to remove the sewage solids which collect on the screen so they may be carried away by the remaining stream portion for further disposal.

Another object is to provide a method and means to filter a liquid by passing through a screen and filtering material; to then chemically treat and aerate the liquid passing through said filtering material and to wash said filtering material.

With the foregoing and other objects in view which will appear as the description proceeds, the invention consists in certain features of novelty in the construction, combination and arrangement of parts by which the said objects are attained, the invention being more particularly pointed out in the claims.

It will be understood that my invention may be used for the separation of any solids from liquids and that various changes may be made in the construction and arrangement of parts without departing from the spirit or sacrificing any of the advantages of the invention as set forth in the appended claims.

In the drawings which represent the preferred embodiment of my invention as applied to a rotating screen:

Figure 1 is an elevation mostly in section on line 1—1 of Fig. 2, of a funnel shaped rotatable screen mounted in a chamber with operating means and a rotatable cleaning brush; means to hold filtering materials about said screen; a shredder to comminute foreign matter floating in the liquid and means to dispose of the solids and liquids.

Fig. 2 is a side elevation of the screen with a portion of the shredder and the screen housing in section on line 2—2, and at pump shaft on line 2'—2', of Fig. 1.

Fig. 3 is an enlarged sectional elevation of a portion of the screen as in Fig. 1, showing the different filtering material holders and their feeding hoppers; the tube means for aerating, washing and chemical treatment, and the screen support.

Fig. 4 is an enlarged fragment of a cage for rollers to guide and support the screen.

Fig. 5 is a plan of the gate at the bottom of the funnel screen to control the material holders surrounding said screen.

Fig. 6 is an enlarged plan of the gate, showing a section of the housing on line 6—6 of Fig. 3, and a different arrangement of openings therethrough from that of Fig. 5.

Fig. 7 is a sectional elevation on line 7—7 of Fig. 8, of a funnel screen, as in Fig. 1, but with a single screen and without the filtering material holders.

Fig. 8 is a side elevation of the screen with a portion of the shredder and the screen housing in section on line 8—8; in section at pump shaft on line 8'—8'; and in side elevation on line 8''—8'' of Fig. 7.

In the figures, 1 is a chamber in which a funnel shaped screen 2, mounted on a bearing cage 3, is slowly rotated. The cage 3 is in the form of a ring having alternately mounted vertical rollers 4 to support, and horizontal rollers 5 to guide, the screen 2. 6 is a ring fastened around the outside of the top of the screen 2 and forms a vertical and a horizontal surface for engaging with the vertical rollers 4 and the horizontal rollers 5 of the cage 3. Built into the top wall of the chamber 1 is a support ring 7 with a Z section and providing a horizontal and a vertical surface opposite the horizontal and vertical surface of the ring 6 and so provide tracks between which the cage 3 with the rollers 4 and 5 form a two-way bearing. The ring 7 thus provides a support and a guide on which the screen 2 rotates by means of the cage 3 as a roller bearing.

Fastened to (as in Fig. 3) or as a part of ring 6 (as in Fig. 1) is a ring gear 8 by which the screen 2 is rotated through the medium of idler gear 9 (Fig. 1) pinion 10 and shaft 11 from the motor 12 through the reduction and speed change gear box 13. Driven from the shaft 11 by means of the bevel gears 14 and 15 is a brush 17. In the construction shown and by reason of the idler gear 9, the brush 17 rotates in a direction opposite to that of the screen 2. The inside surface of the screen 2 is thus swept by brush 17.

The screen referred to generally as 2 is of built up construction from several funnels, telescoped but spaced apart, and each terminating at the bottom with a more or less vertical spout. The perforated or screen portion of the screen 2 on the outside is approximately between the ring 6 and the spout and the screen portion on the inside is that swept by the brush 17. The inside funnel 19 comprises a screen with suitable mesh for collecting sewage solids and having a spout at the bottom extending downward to form a passage 18 for discharging chunks of foreign matter into a shredder.

Outside of funnel 19 are located funnel screens 20, 21, 22 and 23, spaced apart to form annular chambers 24, 25, 26 and 27. Chamber 24 holds, preferably, a coarse filtering material 28 (Fig. 3) as crushed coal or other granulated material. Chamber 25 forms an annular space into which a perforated tube 29 projects. Chamber 26 is adapted to hold an activated carbon 30, or similar material for further clarification and the removing of color and odor. Chamber 27 is adapted to hold a fine filtering material 31, as coal, for final filtration and to help retain any activated carbon escaping from chamber 26.

In the detail drawing of Fig. 3 it will be noted that the chambers 24, 26 and 27, which hold filtering material, are preferably made narrowest in width at the top and gradually increase in width to the bottom of the spouts to insure that the filtering materials will not clog but run freely to the bottom and also freely discharge from the bottom when the gate, to be described later, is opened.

The tube 29 has suitable holes 32, as shown in Fig. 3, for aerating or chemically treating the liquid, as by chlorine. Tube 29 can also supply water to flush the chambers and wash the solids from the filtering materials, intermediate of the times for supplying fresh materials. A three-way valve 33 with pipes 34, 35 and 36 furnish means to supply air, chemicals or water as desired. Two or more tubes 29 can be used where it is preferable to have a separate tube for aerating, washing or chemical treatment in which case the pipes 34, 35 and 36 will each communicate with a separate tube 29 and it will be understood that where more than one operation of aerating, washing or chemical treatment is to be performed at the same time, a separate chamber 25 may be furnished for such treatment, aerating or washing. The washing chamber 25 is preferably next after chamber 24 to more readily flush its contents of solids.

Hoppers 37, 38 and 39 supply fresh filtering materials to the chambers 24, 26 and 27 respectively. Fastened on to the ring support 7 is an apron 40 extending over the top of screen 2 to cover the tops of the chambers 24, 25, 26 and 27 and project down into the top of inner funnel 19. The lower end of each hopper 37, 38 and 39 and the tube 29 projects through the apron 40 and is supported thereby.

Narrow Z-shaped angle braces 41 support and space apart the funnels as shown in Fig. 3. These Z-shaped braces are located near the top and between funnels 19 and 20; 21 and 22; and 22 and 23. On account of the tube 29, which is stationary while the funnels rotate, the braces between funnels 20 and 21 are located below the end of tube 29. The funnels are also supported and spaced apart by Z braces in their spouts as shown.

The chambers 24, 25, 26 and 27 between the funnels extend to a disk gate 42 which is operable by a lever 43 having a limited horizontal movement in a slot 44 in the housing 45. 45 is a housing for the spout portion of the screen 2 with its gate 42 and a shredder located below the spout. In the housing 45 is a partition 46 on which rests the gate 42, the gate and partition having a central opening as a continuation of the passage 18 of the spout.

The construction and operation of the gate 42 is shown in Figs. 5 and 6. Ports extend through the gate 42 to selectively register with similar ports extending through the partition 46 to form discharge openings from the chambers 24, 25, 26 and 27 to empty said chambers. In Fig. 6, 47, 48, 49 and 50 are ports through the gate 42 and located at the bottom of chambers 24, 25, 26 and 27 respectively. The dotted ports 47', 48', 49' and 50' are the ports in the partition 46 which are adapted to be uncovered by ports 47, 48, 49 and 50 respectively. As shown in Fig. 6 all ports are closed and by moving lever 43 to position 43', (the position of the gate 42 in Fig. 3) ports 47 and 48 will register with and open ports 47' and 48'. By moving lever 43 to 43'', ports 49 and 50 will register with and open ports 49' and 50'.

In Fig. 5, ports 47, 49 and 50 are shown adapted to separately register with the ports 47', 49' and 50' when the lever 43 is moved to the position 43a, 43b or 43c to open one port at a time. In the Fig. 5 construction no port in the gate 42 is shown for the chamber 25. This construction is optional as chamber 25 has no filtering material and its liquid can be discharged through its adjacent chambers 24 or 26.

51 is a handle connected to the lever 43 by means of a link 52 for operating the disk gate 42. 53 is a wear ring fastened around the outside of the spout of funnel 23 to cooperate with the packing 54 in the housing 45.

The shredder 55 consists of a cylindrical cutter 56 having cutting knives across its surface, and a slotted plate 57 pivoted at 58 for directing and feeding material to knives of cutter 56 for comminuting the material which drops through passage 18. An adjustable stop screw 59 above pivot 58 regulates the position of plate 57 in relation to cutter 56. A spring operated plunger 60 resiliently holds the plate 57 against stop 59 and allows for movement of plate 57 away from the cutter 56 to prevent jamming and possible injury to cutter 56 or plate 57 in operation. Cutter 56 is mounted on shaft 61 and driven by means of a belt 62 from the motor 63.

In the base of housing 45 is a discharge pipe 64 directed toward the effluent pipe 65 leading from chamber 1. Valve 66 in pipe 64 is controlled by a wheel 67 (Fig. 2) outside of chamber 1. Another discharge pipe 68 from the housing 45 has a pump 69 for forcing the stream of liquid and comminuted material from the shredder 55 for disposal beyond the valve 70. The pump 69 is operated by its shaft 69' and from motor 63 by a belt 71 to the cutter shaft 61.

Above the funnel screen 2 is a chamber 72 with a manhole cover 73 and a pipe 74 for the influent. The pipe 74 can be continued into the chamber 72 to discharge sewage directly into funnel 19 and obviate sewage flowing over apron 40. The influent is preferably regulated to fill funnel 19 only to the height swept by the brush 17.

The operation of the apparatus is as follows:

Coarse filtering material is fed into chamber 24 from hopper 37; activated material, as carbon, is fed into chamber 26 from hopper 38; and a fine filtering material is fed into chamber 27 from hopper 39 while the gate 42 is closed to hold said materials. The influent then enters the chamber 72 through the pipe 74 and fills the funnel 19 of the screen 2 which is slowly rotated by means of its ring gear 8, idler gear 9, pinion 10 and shaft 11 driven from gear box 13 with power furnished by the motor 12. At the same time bevel gears 14 and 15 rotate brush 17 by means of its shaft 16.

The liquid which filters through the screen 2 by passing through the screens of the funnels 19, 20, 21, 22 and 23 and their filtering materials 28, activated carbon 30 and fine material 31, and aerated or chemically treated by supplying chlorine or similar chemical is thus clarified and passing into the chamber 1 flows therefrom through the pipe 65. The liquid from pipe 65 is usually sufficiently clarified to be emptied into a stream, but further clarification may be accomplished by the use of a settling tank, sludge digester or vacuum filter. The sewage solids which cling to and are left on the inside of the funnel 19 by being filtered out of the liquid passing therethrough, are dislodged by the brush 17 and escape with the liquid passing through the shredder 55.

The cutter 56 of the shredder 55 is operated by motor 63 driving shaft 61 by means of belt 62 and the chunks of foreign material which flows with the liquid through passage 18, is comminuted by passing between the plate 57 and the cutter 56 which reduces said material to a fineness suitable for further disposal.

Under ordinary conditions the valve 66 will be closed while valve 70 is open and the comminuted material and liquid will be sucked from the shredder 55 through pipe 68 by the pump 69, which is driven by motor 63 through its pump shaft 69' and belt 71, and forced through valve 70 to a centrifuge or other means of dehydrating and disposal.

This method and means of collecting and disposing of foreign matter as dead animals and various other foreign materials passing along with sewage, does away with the necessity of intercepting and attempting to fish out such foreign matter before it reaches a filtering screen. The liquid which carries the foreign matter to the shredder also carries the sewage solids dislodged from the screen by brush 17 and eliminates the necessity of using a set of brushes to sweep such solids from the ordinary flat screen.

Under flood conditions or when desirable, the pump 69 is not operated and the valve 66 is opened and valve 70 closed. The liquid and comminuted material from the shredder 55 is then passed through pipe 64 to the discharge pipe 65 with the liquid which passes through the screen 2.

When the filtering materials in the chambers 24, 26 and 27 become clogged with sewage solids they are washed by operating the valve 33 to feed water from pipe 36 through the tube 29.

The filtering material is discharged from any of the chambers 24, 26 or 27 by opening the proper port in the partition 46 by means of the gate 42 and replaced from its hopper 37, 38 or 39.

Where the present apparatus is used in connection with industrial wastes, the liquids of said wastes often have either an acid or an alkaline content and under such conditions the tube 29 is used to furnish chemicals to neutralize the liquid while being filtered through the screen 2.

In water purification the valve 66 is closed and where no foreign materials are present or allowed to enter the screen 2, the shredder 55 is not operated and the whole water stream may be made to pass through said screen 2 by closing the valve 70. The water is then purified by being filtered through the screen 19, filtering material 28, screen 20, chemically treated and aerated in the same or separate chambers 25, filtered through screen 21, activated carbon 30, screen 22, filtering material 31 and screen 23, and discharged from chamber 1 through pipe 65. It will be understood that in a lengthy filtration of this kind any sediment collecting at the bottom of housing 45 is discharged by intermittently opening valve 66 or valve 70, or leaving one of said valves partly open to control the amount of liquid discharged.

A modified form of screening apparatus of the funnel type is shown in Figs. 7 and 8 where a coarse screening of the fluid to be filtered is used, or where a single screening without the refinement of screening materials is sufficient, a fine screen may be used. The same parts are designated by the same symbols as in Figs. 1 to 6. In the modified form in Figs. 7 and 8 the general arrangement of parts in Figs. 1 to 6 is observed, the difference being in the use of a single funnel screen 19 without filtering materials and with the screen rotated by a single idler and reducing gear 75 to rotate the screen in a direction opposite to that shown in Fig. 1.

Screen 19 in Figs. 7 and 8 is swept by a brush 17, both operated by motor 12 as previously described for Figs. 1 and 2. The same shredder 55, discharge pipes 64, 68, valves 66, 70 and motor 63 and with connections of Figs. 1 and 2 are shown in Figs. 7 and 8.

The operation of the modified form consists of introducing a liquid, as sewage, into the chamber 72 through the pipe 74 to fill the funnel screen 19, to desired height, which is slowly rotated by means of its ring gear 8, idler 9, reducing gear and idler 75, pinion 10 and shaft 11 driven from gear box 13 with power from motor 12 while bevel gears 14 and 15 rotate brush 17 through shaft 16.

The liquid which filters through the funnel screen 19 passes into chamber 1 and flows therefrom through pipe 65. As this liquid is not as thoroughly clarified as when passing through the screen and filtering materials described with Figs. 1 to 6, it may be necessary to pass the liquid to a settling tank, digester or vacuum filter.

The operation of the shredder is the same as described for the apparatus in Figs. 1 to 6, i. e. the foreign matter which cannot be handled by the screen is passed through the shredder, and being comminuted is pumped away for further disposal, as by a centrifuge.

It will be understood that with my multiple screens the first layer of filtering material assists in removing the solids; that the chlorine oxidizes and disinfects the liquid; that aerating assists in the oxidation and purification and to satisfy the B. O. D. (biochemical oxygen demand); that the activated carbon removes chlorine to free a liquid, as drinking water, of its taste; and that the last layer of filtering material filters out any remaining solids and intercepts and retains any particles of activated carbon.

By passing air through filtering medium while sewage is passing through such medium results in accomplishing a wide diffusion of the air and it is brought intimately into contact with a maximum amount of the sewage passing through each unit.

Oxygen supplied to sewage effluent by passing air through it tends to stabilize the liquid by replacing and furnishing the necessary oxygen to satisfy the B. O. D., which is the biochemical oxygen demand of said liquid.

Having thus described my invention, I claim:

1. In an apparatus for clarifying a liquid, a filter composed of a plurality of funnel screens spaced apart to form chambers therebetween means to rotate said filter, means to feed a liquid over the inner surface of said filter, means to sweep accumulated solids from said surface, first, second and third chambers in said filter, means to hold filtering material in said first chamber through which said liquid is filtered, means to feed chlorine into said second chamber of said filter, means to feed air into said second chamber of said filter and means to hold an activated carbon in said third chamber of said filter.

2. In an apparatus for clarifying a liquid, a filter composed of a plurality of funnel screens spaced apart to form chambers therebetween means to rotate said filter, means to feed a liquid over the inner surface of said filter, brush means to sweep solids from said surface, a first chamber, means to hold a filtering material in said first chamber of said filter, a second chamber, and means to feed water into said second chamber of said filter to wash said filtering material.

3. In an apparatus for clarifying a liquid, a filter composed of a plurality of funnel screens spaced apart to form chambers therebetween means to rotate said filter, means to feed a liquid over the inner surface of said filter, a first chamber, means to hold a filtering material in said first chamber of said filter, a second chamber, means to feed a chemical into said second chamber of said filter, means to feed air into said second chamber of said filter and means to feed water into said second chamber of said filter to flush said chambers and wash said filtering material.

4. In an apparatus for clarifying a liquid, a filter composed of a plurality of funnel screens spaced apart to form chambers therebetween means to rotate said filter, means to feed a liquid over the inner surface of said filter, means to hold a filtering material in said filter, means to chemically treat the liquid filtered through said filtering material and means to aerate the liquid filtered through said filtering material.

5. In an apparatus for clarifying a liquid, a funnel screen, a spout to form a passage at the apex of said screen, means to feed a liquid into said screen, a brush, means to sweep said brush over the inner surface of said screen means to rotate said brush, means to form a passage beyond said spout to carry away the liquid passing through said spout, means to control said passage whereby the liquid normally flowing through said spout may be filtered through said screen and means to carry the filtered liquid from said screen.

6. In an apparatus for clarifying a liquid, a screen composed of a plurality of funnels spaced apart to form annular chambers between said funnels, bearing means to support and guide said screen, means to rotate said screen, means to feed a liquid into said screen means to carry the filtered liquid from said screen, a brush to contact with the inner surface of said screen to remove solids deposited by the filtration of said liquid through said screen, means to rotate said brush, means to feed filtering material into the inner and outer annular chambers formed by said said funnels, means to feed an activated carbon into one chamber and means to feed chlorine into another chamber intermediate of said inner and outer chambers whereby the liquid filtered through the inner chamber will be treated by said chlorine and whereby the chlorinated liquid will then be filtered through the activated carbon.

7. In an apparatus for clarifying a liquid, a screen composed of a plurality of funnels and having a spout to form a passage at the apex of said screen, said funnels spaced apart to form annular chambers therebetween, means to rotate said screen, means to feed a liquid into said screen means to carry the filtered liquid from said screen, brush means to sweep the inner surface of said screen, means to rotate said brush, means to feed a coarse filtering material into the inner annular chamber and a fine filtering material into the outer annular chamber, means to feed chlorine into the annular chamber below the coarse filtering material chamber and means to feed an activated carbon above the fine filtering material chamber, whereby a portion of said liquid will carry foreign material through said spout passage and whereby the liquid passing through said screen will be filtered to remove solids, disinfected by chlorine, filtered through activated carbon to remove color, odor and excess chlorine and finally filtered to remove finer solids and activated carbon.

8. In an apparatus for clarifying a liquid, a screen composed of a plurality of funnels and having a spout to form a passage at the apex of said screen, said funnels spaced apart to form annular chambers therebetween, said annular chambers being an inner, an outer and two intermediate chambers, said annular chambers increasing in width toward the bottom, means to rotate said screen, means to feed a liquid into said screen means to carry the filtered liquid from said screen, means to sweep the inner surface of said screen, means to feed filtering materials into the inner and outer chambers formed by said funnels, means to feed an activated carbon into one of said intermediate chambers above said outer chamber, means to feed chlorine into the other intermediate chamber below said inner chamber, means to aerate said chlorine chamber and means to feed water into said chlorine chamber to flush the several chambers and wash the filtering materials.

9. In an apparatus for clarifying a liquid, a funnel screen means to rotate said screen, means to feed a liquid into said screen means to carry the filtered liquid from said screen, a spout at the apex of said funnel screen, a brush contacting with the inner surface of said screen, means to rotate said brush, a shredder to receive a portion of said liquid and the foreign matter in said liquid portion and means to operate said shredder to comminute the foregin matter passing into said shredder.

10. In an apparatus for clarifying a liquid, a funnel screen to filter said liquid, a spout at the apex of said screen, means to feed a liquid into said screen, means to sweep the inner surface of said screen, means to rotate said screen, a shredder to receive the portion of said liquid and the foreign matter passing through said spout, means to operate said shredder to comminute the foreign matter passing into said shredder, means to convey the comminuted matter and liquid from said shredder, valve means to control said conveying means and means to carry the filtered liquid from said screen.

11. In an apparatus for clarifying a liquid, a screen composed of a plurality of funnels, said funnels spaced apart to form annular chambers therebetween, means to rotate said screen, means to feed a liquid into said screen means to carry the filtered liquid from said screen, means to sweep the inner surface of said screen, means to feed a filtering material into one of said chambers formed by said funnels filter supporting means at the bottom of said filtering material chamber, means to feed a chemical into another of said chambers and means to discharge the filtering material from the filtering material chamber.

12. In an apparatus for clarifying a liquid, a screen composed of a plurality of funnels and having a spout to form a passage at the apex of said screen, said funnels spaced apart to form annular chambers therebetween, means to feed a liquid into said screen means to carry the filtered liquid from said screen, means to sweep the inner surface of said screen, means to rotate said screen, means to feed a filtering material into the inner and outer chambers formed by said funnels, conducting means communicating with said spout and means at said spout to separately discharge said filtering material from said inner and outer chamber whereby the discharged filtering material will be carried away in the liquid which passes through said spout.

13. In an apparatus for clarifying a liquid, a screen composed of a plurality of screened funnels spaced apart to form a chamber therebetween means to rotate said screen, means to feed a liquid into said screen, means to sweep the inner surface of said screen, means to carry the filtered liquid from said screen, means to feed a filtering material into said chamber between said screen funnels and means to discharge the filtering material from said chamber.

14. In an apparatus for clarifying a liquid, a screen composed of a plurality of funnels and having a spout to form a passage at the apex of said screen, means to rotate said screen, said funnels spaced apart to form annular chambers therebetween, means to feed a liquid into said screen, means to carry the filtered liquid from said screen, a brush to sweep the inner surface of said screen, means to feed a filtering material into a chamber, means to chemically treat the liquid by introducing chlorine into said liquid while filtering through said screen, a housing to inclose said spout and a gate in said housing to discharge said filtering material.

15. In an apparatus for clarifying a liquid, a screen composed of two or more funnels having one or more annular chambers therebetween and having a spout at the apex of said screen, means to rotate said screen, means to feed a liquid into said screen, means to carry the filtered liquid from said screen, a brush to sweep the inner surface of said screen, means to feed a filtering material into one or more of said chambers, a housing to inclose said spout, and a gate in said housing to discharge the filtering material into the liquid which passes through said spout.

JOHN SCHAAF.